US011978304B2

(12) United States Patent
Yee et al.

(10) Patent No.: US 11,978,304 B2
(45) Date of Patent: May 7, 2024

(54) SYSTEM AND METHOD FOR HOSTING AND MANAGING A LIVE GAME

(71) Applicant: LNW Gaming, Inc., Las Vegas, NV (US)

(72) Inventors: Ryan Masao Yee, Las Vegas, NV (US); Jeremy Halter, Las Vegas, NV (US); Mark Lowell, Las Vegas, NV (US); Scott Hilbert, Sparks, NV (US); Dat Ta, Sparks, NV (US); Sridhar Gondesi, Streamwood, IL (US); William Jones, Boulder, CO (US); Joseph R. Hedrick, Reno, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 18/083,771

(22) Filed: Dec. 19, 2022

(65) Prior Publication Data

US 2023/0124919 A1 Apr. 20, 2023

Related U.S. Application Data

(63) Continuation of application No. 16/837,609, filed on Apr. 1, 2020, now Pat. No. 11,562,621, which is a (Continued)

(51) Int. Cl.
*G07F 17/32* (2006.01)
*A63F 1/06* (2006.01)
(Continued)

(52) U.S. Cl.
CPC ............ *G07F 17/322* (2013.01); *A63F 1/067* (2013.01); *A63F 1/18* (2013.01); *A63F 3/00157* (2013.01);
(Continued)

(58) Field of Classification Search
CPC ............... G07F 17/322; G07F 17/3202; G07F 17/3204; G07F 17/3211; G07F 17/3218;
(Continued)

(56) References Cited

U.S. PATENT DOCUMENTS 4,836,553 A 6/1989 Suttle et al.
5,559,312 A * 9/1996 Lucero .................... G07F 17/32 902/23

(Continued)

OTHER PUBLICATIONS

U.S. Appl. No. 62/466,865, filed Mar. 3, 2017.

*Primary Examiner* — Michael A Cuff

(57) ABSTRACT

A system and method for hosting and managing a live game are disclosed which includes a live gaming table for live players and a live dealer. In an embodiment an application configures a player's mobile device to receive an invitation from a casino to play the table game based upon the player being, based upon location aware technology, being in or near the casino. Accepting the invention permits the player to reserve a position at the gaming table and displays a machine readable code at the player's mobile device. The player positions at the gaming table include video display and player input devices (VDPIDs) and a code reader to read the displayed code and access the player's electronic account. Using the VDPID the player may convert between electronic funds and physical gaming chips, participate in video bonus event play and back-bet on other players.

17 Claims, 11 Drawing Sheets

Related U.S. Application Data continuation of application No. 15/902,112, filed on Feb. 22, 2018, now Pat. No. 10,643,424.

(60) Provisional application No. 62/466,865, filed on Mar. 3, 2017.

(51) Int. Cl.

| | |
|---|---|
| ***A63F 1/18*** | (2006.01) |
| ***A63F 3/00*** | (2006.01) |
| ***G07F 17/34*** | (2006.01) |
| *A63F 9/04* | (2006.01) |

(52) U.S. Cl.

CPC ...... *G07F 17/3206* (2013.01); *G07F 17/3209* (2013.01); *G07F 17/3218* (2013.01); *G07F 17/3223* (2013.01); *G07F 17/323* (2013.01); *G07F 17/3239* (2013.01); *G07F 17/3246* (2013.01); *G07F 17/3248* (2013.01); *G07F 17/3255* (2013.01); *G07F 17/3258* (2013.01); *G07F 17/3267* (2013.01); *G07F 17/3288* (2013.01); *G07F 17/3293* (2013.01); *G07F 17/34* (2013.01); *A63F 9/04* (2013.01)

(58) Field of Classification Search

CPC ............. G07F 17/3255; G07F 17/3223; G07F 17/3239; G07F 17/3293; G07F 17/3209; G07F 17/323

USPC .......................................... 463/16, 17, 37, 40

See application file for complete search history.

(56) References Cited

U.S. PATENT DOCUMENTS

| | | | |
|---|---|---|---|
| 5,586,936 | A | 12/1996 | Bennett et al. |
| 5,630,586 | A | 5/1997 | Lowden |
| 5,743,800 | A | 4/1998 | Huard et al. |
| 5,794,964 | A | 8/1998 | Jones et al. |
| 6,722,974 | B2 | 4/2004 | Sines et al. |
| 6,789,801 | B2 | 9/2004 | Snow |
| 6,808,173 | B2 | 10/2004 | Snow |
| 7,618,321 | B2 | 11/2009 | Crawford, III et al. |
| 8,142,271 | B2 | 3/2012 | Kuhn et al. |
| 8,251,802 | B2 | 8/2012 | Snow |
| 8,663,000 | B2 | 3/2014 | Olive |
| 8,992,323 | B2 | 3/2015 | Kelly et al. |
| 9,126,102 | B2 | 9/2015 | Snow et al. |
| 9,142,084 | B2 | 9/2015 | Kelly et al. |
| 9,275,514 | B2 | 3/2016 | Kelly et al. |
| 9,384,629 | B2 | 7/2016 | Chun et al. |
| 9,400,321 | B2 | 7/2016 | Huang et al. |
| 9,452,346 | B2 | 9/2016 | Grauzer et al. |
| 9,916,735 | B2 * | 3/2018 | Chun .................. G07F 17/3211 |
| 2002/0077170 | A1 | 6/2002 | Johnson et al. |
| 2002/0183110 | A1 * | 12/2002 | Flanagan-Parks ...... G07F 17/32 463/25 |
| 2005/0107156 | A1 | 5/2005 | Potts et al. |
| 2008/0167106 | A1 | 7/2008 | Lutnick et al. |
| 2012/0049455 | A1 | 3/2012 | Yap et al. |
| 2014/0094256 | A1 | 4/2014 | Hilbert et al. |
| 2015/0187177 | A1 | 7/2015 | Warner et al. |
| 2015/0339654 | A1 | 11/2015 | Warner et al. |
| 2016/0217657 | A1 | 7/2016 | Halter et al. |
| 2017/0270752 | A1 * | 9/2017 | Snow .................... G07F 17/323 |
| 2019/0139363 | A1 * | 5/2019 | deWaal ............... G07F 17/3267 |

* cited by examiner

SYSTEM AND METHOD FOR HOSTING AND MANAGING A LIVE GAME

CROSS-REFERENCE TO RELATED APPLICATION(S)

This application is a divisional application of U.S. patent application Ser. No. 16/837,609 filed Apr. 1, 2020, which is a continuation of U.S. patent application Ser. No. 15/902,112 filed Feb. 22, 2018 (now U.S. Pat. No. 10,643,424) which claims the benefit of prior filed U.S. Provisional Patent Application Ser. No. 62/466,865 filed Mar. 3, 2017, The disclosures of the Ser. No. 16/837,609 application, the Ser. No. 15/902,112 application, and the 62/466,865 application are each incorporated by reference herein in their respective entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2022 LNW Gaming, Inc.

FIELD

This disclosure relates generally to systems, methods and apparatus for hosting a table game having a base game and primary bonus game and which includes for each player a video display and player input device to enable the players to exchange between cash, electronic funds and gaming chips, redeem promotions, participate in secondary bonus games including progressive games, to bet on other players and to interface with venue messaging. The disclosure also relates to systems and methods to accept promotions and remotely reserve a seat at a table game.

BACKGROUND

Gaming venues such as casinos have long known to provide live table games such as Blackjack, Pai Gow, Baccarat, Craps, Poker and other games. A common aspect of these games is a live dealer(s) and live players occupying positions about a physical gaming table. The gaming table in most cases includes a surface bearing a layout printed with information such as designating player positions, betting areas to control and identify the propositions wagered on by the players and the placement of game pieces such as playing cards. To play the game players must find an open position at the table from which to participate.

In many modern casino venues with live table and electronic machine gaming, players may enroll in a player loyalty club. The club is administered through a communication network including one or more servers hosting player data. Upon enrollment, these clubs provide a loyalty (or player's) card for the player to identify himself/herself to the system. Enrollment may include a player establishing an electronic account to be a repository for electronic funds. In some cases the account is funded by the player presenting value such as cash, chips, electronic transfer of funds from a financial institution or credit card company or some other form of value. To wager on live table games players must present casino-compatible, physical gaming chips or cash, which are converted by the dealer into physical gaining chips.

In relation to these table games, it has been known to provide a primary game bonus feature where the bonus is based upon the play/outcome of the base game. For example, Snow, U.S. Pat. No. 6,808,173 discloses a Blackjack base game with a primary bonus game side bet proposition which can be fulfilled based upon the player's cards and the dealer's face up card. Snow, U.S. Pat. No. 6,789,801 discloses a Baccarat base game with a primary game side wager for a bonus based upon the numerical difference between the winning and losing Banker or Player hands. Snow et al U.S. Pat. No. 9,126,102 teaches a four-card Poker game with a bonus wager. Suttle et al U.S. Pat. No. 4,836,553 describes a table game having a primary bonus game with a progressive bonus feature and requiring a side wager.

In the past, for many table games, the application of progressive jackpots was a challenge since there was no mechanism to receive progressive side wagers for allocation to the jackpot and to memorialize participation on the progressive proposition. In Jones et al U.S. Pat. No. 5,794,964, an early attempt at a solution discloses a table game providing a progressive jackpot for a table game, which includes a token acceptor associated with each player position. Insertion of a physical token indicated the player's participation and provided a processor with information to increment a progressive prize. The table game of Caribbean Stud''' is a commercial offering including this feature. Kelly et al U.S. Pat. No. 9,142,084, issued Sep. 22, 2015 and titled "WAGER RECOGNITION SYSTEM," the disclosure of which is incorporated by reference, discloses an optical bet detection unit for a gaming table which can be used to detect a progressive participation wager.

Halter et al US 2016/0217657 filed Mar. 24, 2016 and titled SYSTEMS AND METHODS OF LINKING GAMING STATIONS," the disclosure of which is incorporated by reference, teaches a system for linking progressive prizes between gaming tables offering different games and providing a spinning wheel feature when a qualifying base game triggering event has occurred.

It has also been known to provide promotions toward the play of table games. These promotions are in the form of a printed voucher or coupon which may, for example, double a table game wager, e.g. if the player wagers $5 the voucher may act to double the wager to $10. The use of paper vouchers restricts the nature and utility of such instruments.

Some drawbacks to table gaming has been the nature and type of bonusing which can be provided to attract players, the inability of a player to access electronic funds for conversion into physical gaming chips and the inability of a player to remotely accept a table game promotion and reserve a seat at the corresponding gaining table to redeem the promotion. A further drawback is that players could not wager upon another player that other player will, for example, hit the jackpot.

BRIEF SUMMARY

There is, therefore, set forth according to one or more embodiments of the present invention, a system, method and apparatus which provide, for live table games, the ability to provide promotions and various bonusing games, the ability to remotely accept promotions and reserve a position at the gaming table, to access electronic funds accounts for conversion into physical gaining chips for live player as well as other features and advantages disclosed herein. Toward this end, in a casino venue, a live gaming table is provided which offers a base game with a bonus game and having a physical base game layout with multiple player positions each to accommodate a live player. The base game provides for the play of a game resulting in a winning or losing outcome for each participating player. For example, the base game may be live Blackjack, Baccarat, Roulette, Craps or Poker or related games. These games use physical items such as cards or dice to control play and display outcomes. Related to the system of an embodiment of the present invention the players have electronic interface devices including a user input and a video display and adapted for communication with various remote resources. These devices may include a player's own mobile device or an interface device provided by the gaming venue. The system includes a software application (App) operating on the interface device, a communication network and a remote processor. The communication network includes at least wireless and wired sub-networks. The remote processor may be hosted by the venue—but remote from the gaming table. A data structure associable with the remote processor includes a player account storing data representing player account information including, for example, available electronic funds and a virtual promotion. The data structure may be associated with the player's casino loyalty account and host an electronic wallet (eWallet) storing the electronic funds for the player. Where the interface device is a Player's mobile device the system may include an apparatus/system to detect when a player enters or approaches the casino venue and, through the communication network, cause the player's mobile device App to receive from the remote processor a promotion to play the table game. The detection system may be based upon GPS, Wi-Fi or other location awareness techniques. The App is configured to display the promotion at the player's mobile device video display to enable the player to accept the promotion and to reserve a position at the gaming table associated with the promotion. One of the offer and acceptance video displays may include an optically readable code displayed at the mobile device display for redemption.

The live gaming table includes at each player position a video display and player interface device (VDPID) and a bet sensing and code reading apparatus. As stated above the VDPID may be embodied as the player's own mobile device appropriately configured by an APP or may be a venue provided device. In an embodiment where a venue provided VDPID is used the gaming table may be configured to include docking stations at each player position for docking the VDPIDs for communication on the network. In this fashion, in an embodiment, the gaming table may be configured for normal play—play not using the VDPIDs and converted for VDPID play by docking the VDPIDs to their stations.

The communication network provides communication between the VDPIDs, a host processor and the remote processor. The communication network may be wired using the docking stations or wireless. A bet sensing and code reading apparatus is configured to sense the placement of a token to participate in the bonus game—such as a bonus game having a progressive prize—and to optically read the code displayed at the player's mobile device display to, through the communication network, access the player's account for access to the player's eWallet and for redemption of a promotion. Reading of the promotion code may also log the player into their casino loyalty account. The gaming table also has a dealer terminal (for the dealer) in communication with the host processor and remote processor mid a chip tray holding an inventory of gaming tokens, i.e. chips.

Each VDPID is configured to communicate with the remote processor to enable the player to request funds from their eWallet account to be converted by the dealer into physical tokens for play of the base and feature game or, where provided, to post electronic wagers on one or more propositions.

The host processor includes a game manager. In response to a bonus game triggering event—such as a game-triggering base game outcome or the occurrence of a random event not associated with the base game such as a mystery event—the game manager controls one or more VDPIDs to display a bonus game played by one or more participating players to provide an outcome for the bonus game. The feature may be a picking game (selecting icons representing an undisclosed prize or prizes, spinning of a wheel or other feature game). For example, the bonus game may include one or more progressive prize awards based upon a triggering event such as the participating player receiving a certain hand of cards in the base game (perhaps a Royal Flush in a Poker related game top prize outcome) as well as lesser prize awards of fixed prizes or the opportunity to play the wheel or picking game). The award may be paid in tokens or electronically to the player's eWallet.

The VDPIDs provide other functionality for the player including the ability to view their eWallet account, their loyalty account and to obtain services such as beverages. Additionally the VDPID provides for a player to "back bet" on other players at their table or another table or play other games such as a video slot machine game during, for example, periods of inactivity at the gaming table.

At the dealer terminal, the system enables the player to cash out their physical tokens in exchange for uploading the electronic equivalent to the player's eWallet account as well as exchanging value in their eWallet for physical gaining tokens. The system accommodates either cashing the player out in physical chips or uploading the funds to the player's eWallet account.

BRIEF DESCRIPTION OF THE DRAWINGS

These and other features and advantages will become evident upon review of the following Description and Claims wherein:

DESCRIPTION

Figure 1:
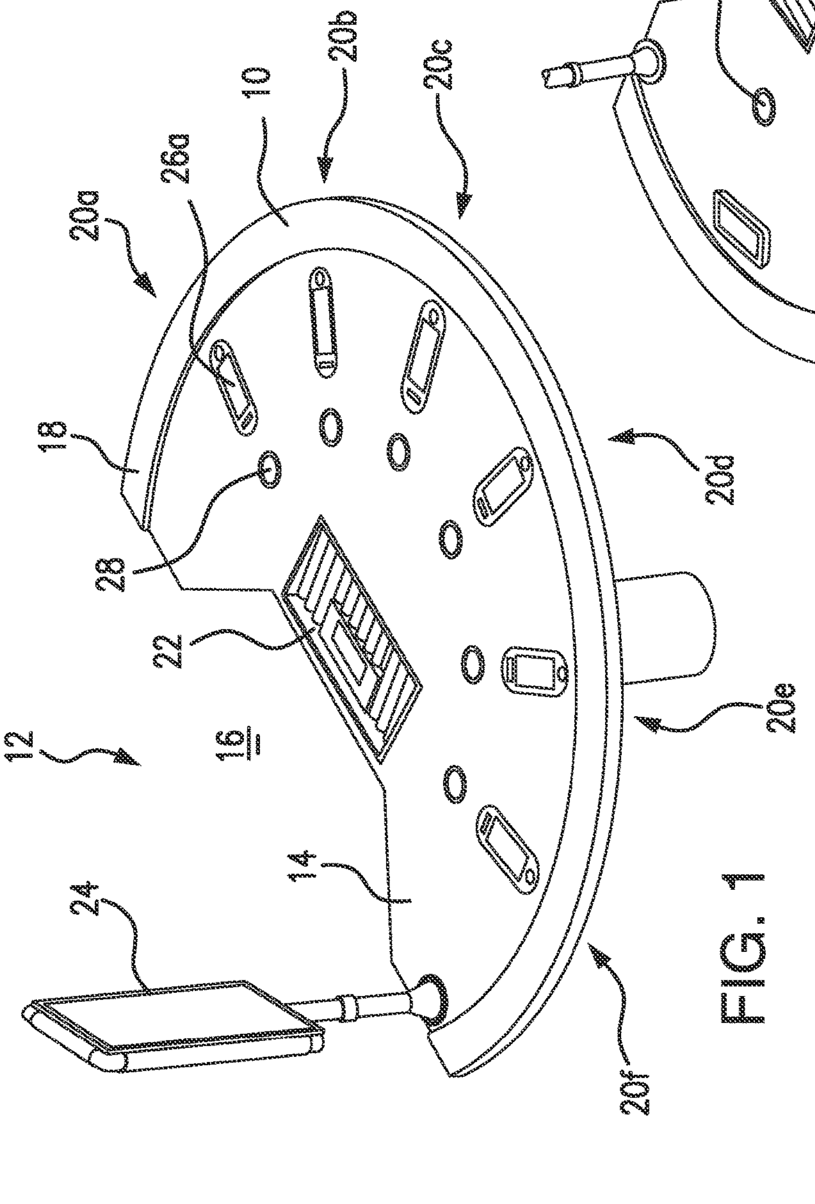
FIG. 1 is a top-front perspective view of a gaming table according to an embodiment of the invention where video display and player interface devices (VDPIDs) are built into the gaming table.

The illustrations presented in this disclosure are not meant to be actual views of any particular act in a method, apparatus, system, or component thereof, but are merely idealized representations employed to describe illustrative embodiments. Thus, the drawings are not necessarily to scale. Additionally, elements common between figures may retain the same or similar numerical designation. Elements with the same number, but including a different alphabet character as a suffix should be considered as multiple instantiations of substantially similar elements and may be referred to generically without an alphabet character suffix.

The terms "gaming," "gambling," and the like, refer to activities, games, sessions, rounds, hands, rolls, operations, and other events related to wagering games, the outcome of which is at least partially based on one or more random events ("chance" or "chances"), and on which wagers may be placed by a player. In addition, the words "wager," "bet," "bid," and the like, refer to any type of wager, bet, or gaming venture that is placed on the occurrence of random events, whether of monetary or non-monetary value. Points, credits, and other items of value may be purchased, earned, or otherwise issued prior to beginning the wagering game. In some embodiments, purchased points, credits, or other items of value may have an exchange rate that is not one-to-one to the currency used by the user. For example, a wager may include money, points, credits, symbols, or other items that may have some value related to a wagering game. Wagers may be placed in wagering games that involve the risk of real-world monetary value for the potential of payouts with real-world monetary value (e.g., the "play-for-pay," such as "house-banked" and "player-banked" configurations, each of which is described in more detail below) or in wagering games that involve no real-world monetary risks for the player (e.g., the "play-for-fun" and "social play-for-fun" configurations described in more detail below).

As used herein, the term "wager" includes any form of wagering value, including money, casino chips, tokens other physical means for payment, and online or remote electronic authorization of a wager in any acceptable form to the casino or online or virtual game host. Also included are physical representations of money (e.g., casino chips) at a local game, as well as virtual representations of money in the form of electronic authorizations of a transfer of money and digital representations of money (e.g., digital representations of bills or coins, digital representations of chips, numerical quantities of money, numerical quantities of points, or numerical quantities of credits) at a local or remote electronic gaming device. As used herein, the term "wagering element" means and includes objects and symbols used to signify the acceptance of a wager. For example, physical wagering elements include physical money (e.g., bills and coins) and physical wagering tokens (e.g., poker chips), which may or may not be redeemable for monetary value and may or may not include electronic identifiers (e.g., RFID chips) embedded within the tokens, enabling electronic sensing and tracking of wagering. Virtual wagering elements include, for example, images (e.g., images of money or poker chips) and text (e.g., a string of numbers), which may or may not be redeemable for monetary value. In the "play-for-fun" and "social play-for-fun" configurations, a "wager" may not have a cash value (i.e., a real-world monetary value).

While the following description is directed to a live table base game such as Blackjack playing on a table having the traditional, semi-circular shape, it should be understood that the inventions described herein can be applied to other live games such as Craps, Roulette, Sic-Bo or other games whose live table may have a different shape and layout. Further, the present invention is agnostic to the nature of the underlying base game since the apparatus, system and method described herein can be applied to any nature of a base game which includes a bonus or feature game component.

Referring to FIG. 1, an embodiment of the gaming table 10 for the system 12 is shown. The table 10 may have a traditional configuration such as semi-circular to support a layout 14 which may be fashioned from felt and printed with information such as game related information, e.g. a game associated logo, pay table and associated graphics as well as denoting player positions about the table as is known (not shown). At one side of the table 10 is a dealer position 16 for a live dealer to administer the game and spaced about the arcuate rail 18 are player positions 20*a-f* for live players. A chip or token tray 22 is associated with the dealer position to hold, as is known, an inventory of physical chips/tokens for the play of the game. Not shown in FIG. 1 but described below is a dealer terminal to provide operational and system 12 related displays to the dealer and to receive dealer inputs. Also not shown are legs or a stand to support the table 10 for seated players. A video table display 24 may be mounted to the table 10 to display information to the players about the table 10 as well as to provide displays and information according to various embodiments of the invention.

Figure 3B:
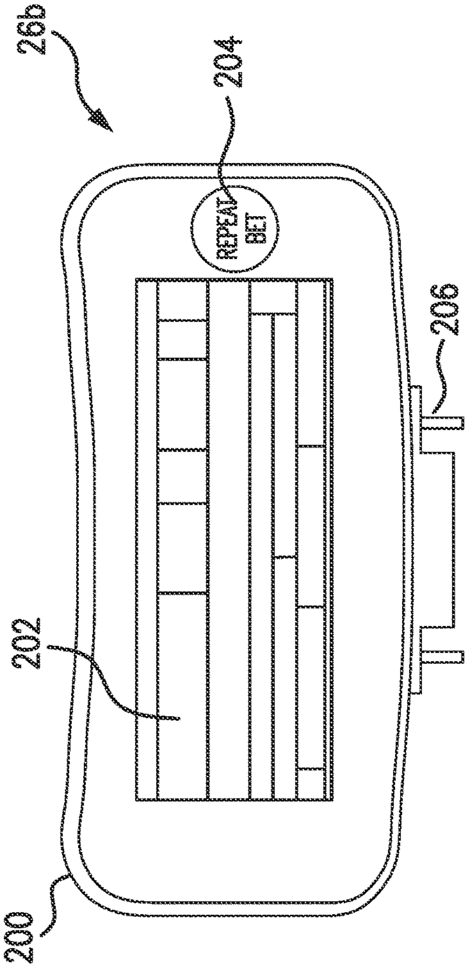
FIGS. 3A and B are side and top views of a video display player interface devices (VDPIDs) of FIG. 2.
FIG. 3C is a top, enlarged, view of a VDPID for the embodiment of FIG. 1 also depicting the bet sensing and code reading apparatus.
Figure 3C:
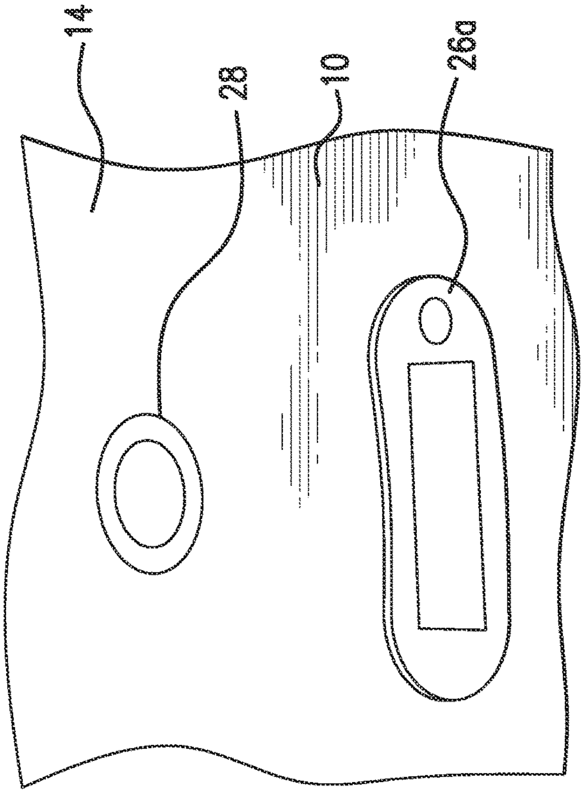

Associated with each player position 20*a-f* is a video display and player input device (VDPID) 26*a* as well as a bet sensor 28 shown in an enlarged view at FIG. 3C. As described herein the VDPIDs 26*a* provide system access to each player for the purposes of which will hereinafter become evident. As also will be described the bet sensors 28 provide for detection of a wagering token placed thereon as well as for reading displayed codes (e.g. bar codes, QR codes, glyphs, etc.) in addition to support the play and management of the game and player convenience. In this embodiment, the VDPIDs 26*a* are built into the table 10 as by being nested flush into the table 10 and may be arranged, with reference to the player positions, vertically (as shown) or horizontally. The details of the VDPIDs 26*a* are described below.

Figure 2:
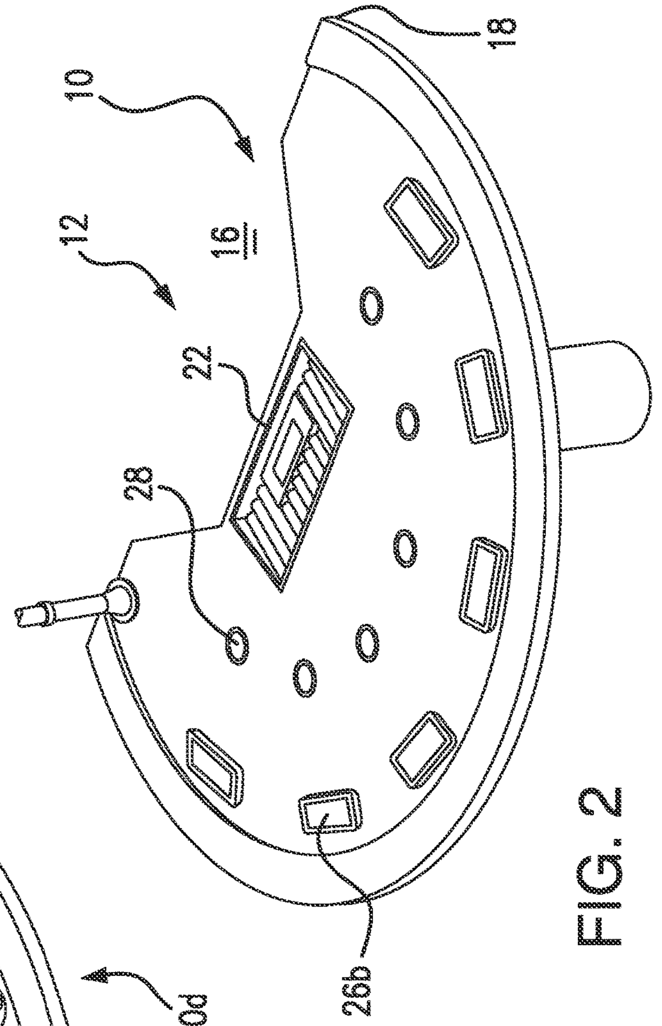
FIG. 2 is a top-front perspective view of another embodiment of the present invention where VDPIDs are connected via docking stations at the gaming table.

FIG. 2 shows an alternate embodiment for a table 10. In this embodiment, the VDPIDs 26*b* are embodied as modules which may be docked to suitable docking station connections (not shown) at the table 10. This embodiment for the VDPIDs 26*b* reduces the modifications to conventional tables 10 required to host, the VDPIDs 26*a* of FIG. 1. This form factor for the VDPIDs 26*b* is suited to be retrofit with existing tables 10 in the field. Also where the electronic and communication functionality offered by the VDPIDs 26*b* is not required they can be removed and the table 10 can be used to host a traditional table game such as Blackjack. The VDPIDs 26*b* docked at the table 10 may be arranged, with reference to the player positions, horizontally.

Figure 3A:
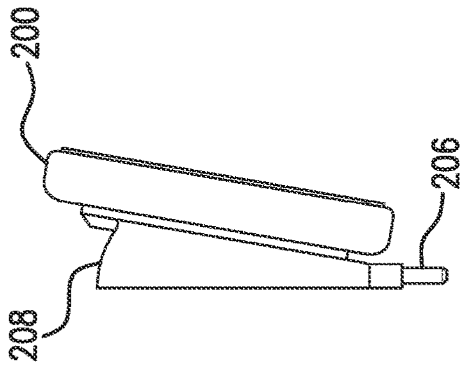

FIGS. 3A and B show the VDPIDs 26*b* in enlarged views. Each VDPID 26*b* includes a closed housing 200 supporting a touch-screen video display 202 and a button 204 that may provide a shortcut such as a "repeat bet" or start feature. The button 204 may instead be defined on the VDPID 26*a, b* touch screen display as a touch screen button. The housing 200 also supports one of a male-female connection 206 for docking the VDPID 26*b* to the table 10 such as about the rail of the table 10. The hardware/firmware/software components for the VDPID 26*b* may be similar to the iView system interface device for gaming machines sold by Bally Gaming, Inc. of Las Vegas, NV and as described in Kelly et al, U.S. Pat. No. 9,275,514 issued Mar. 1, 2016 and titled "SYSTEM AND METHOD FOR PROVIDING A SYSTEM GENERATED IN-GAME BONUS IN A GAMING ENVIRONMENT," the disclosure of which is hereby incorporated by reference. A base 208 is adapted to rest on the surface of the table 10 to orient the VDPID 26*b* in a tilted orientation to position the video display 202 for viewing by the player.

FIG. 3C illustrates the components associated with the player positions 20*a-f* for the embodiment of FIG. 1. The VDPID 26*a* has the same functional architecture as the VDPID 26*b*, however, it has a different form-factor to nest flush at the table 10. As such, VDPID 26*a* includes a video display 202 and button 204 as described above. Unlike the VDPID 26*b*, the table 10 is fashioned to have openings to accommodate the VDPIDs 26 whose connections and wirings are beneath the surface of the table 10.

The bet sensors 28 may be of the type described in Kelly et al, U.S. Pat. No. 9,142,084 issued Sep. 22, 2015 and titled "WAGERING RECOGNITION SYSTEM", the disclosure of which is incorporated by reference. According to the present invention, to provide for the optical reading of displayed or printed codes, the bet sensors 28 are configured to include upward optical scanning. Bet sensors 28, as shown in FIGS. 1 and 2 may be provided for either embodiment.

The VDPIDs 26*a, b* are adapted to provide to the players an interface to the system 12 for various operations. Broadly, the VDPIDs 26*a,b* provide player access to a player's loyalty account to view his/her status and loyalty points, access to the player's eWallet (an electronic moneyed, funded account) and other features and benefits provided by the venue. The VDPIDs 26*a, b* enable the players to access and use or convert eWallet funds into physical gaming tokens for the play of the game and to make electronic wagers on various propositions. Additionally, the players may receive advertising and promotions as well as system 12 provided games and features. An advantage of the VDPIDs 26*a, b* is that their form factor is familiar to players as reminiscent of mobile telephones.

Figure 4:
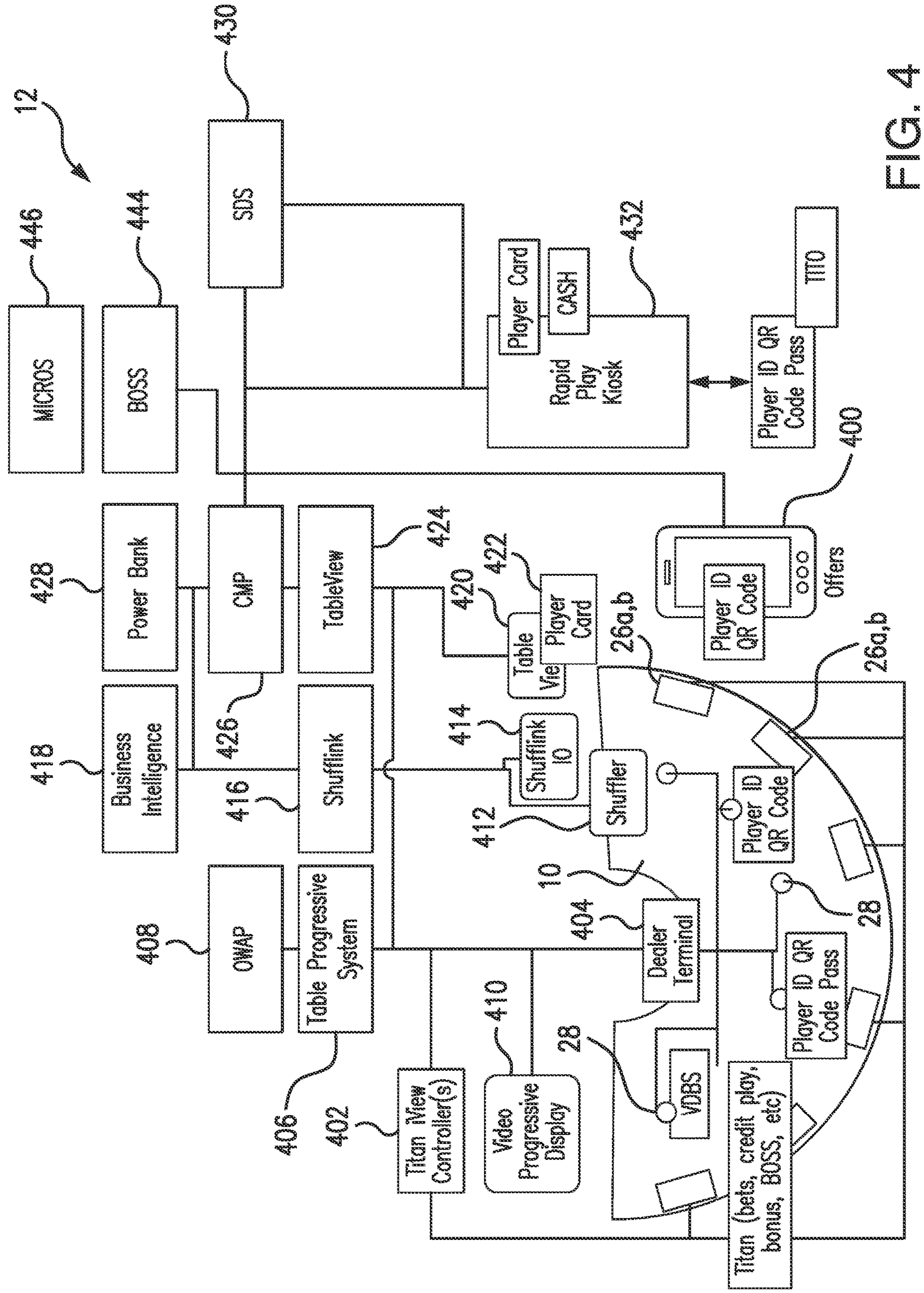
FIG. 4 is a systems diagram according to an embodiment of the present invention.

To provide the above functionalities and others the system 12 as depicted in FIG. 4 is provided. According to various embodiments the system 12 may be configured to interact with players' mobile devices shown as a smart phone 400. The system 12 communicates with the phone 400 through a communication network, which network may include Wi-Fi, NFC, infrared or other wireless communications as well as hard wired (e.g. CAT IV or CAT V) cabling. The system 12 may also communicate with the phone 400 through Broadband communication such as through cellular communication vendors. In an embodiment when the player enters or approaches the venue that hosts the system 12, a software application (App) obtained by the player for example, by the player from the venue's internet site or when the player enrolls in the venue's loyalty program, awakes. The App may configure the phone 400 to act as a "beacon" awaiting a response from the system 12 or the App may configure the phone 400 to act as the "responder" to a beacon transmitted by the system 12. To determine the geo-location of the phone 400 location aware technology such as GPS, mobile wireless gateway techniques as described in Huang et al, U.S. Pat. No. 9,400,321 issued Jul. 26, 2016 (the disclosure of which is incorporated by reference), iBeacon, Wi-Fi positioning system and techniques such as RSSI localization, fingerprinting, triangulation or the like functions to determine at the least, the approximate location of the phone 400 as being within or adjacent to the venue. For example, using any available technique the player's App and the system 12 communicate and negotiate to enter into a communication phase when it is determined that the player has entered or is approaching the casino. The App may direct the display at the player's mobile device 400 to display a video or audio/video greeting such as "Hi Phil" and display one or more promotions, advertisements or the like. Pertinent to the system 12 of the various embodiments of the present invention an App may be directed to display a promotion related to play at the table 10 such as "$20 Free Play of Our New Bonus Blackjack Table Game". The display of the promotion may be accompanied by a displayed bar code, QR code or other associated optically "scanable" code.

Continuing with FIG. 4, the table 10 is integrated into the system 12. The VDPIDs 26*a, b* are in communication with one or more VDPID controllers 402, which communication may be wired or wireless. The bet sensors 28 are in communication with a dealer terminal 404 which, in turn, is in communication with a local progressive controller 406 and operator wide area progressive (OWAP) 408 which, alone or in conjunction with the local progressive controller 406, serves to administer one or more progressive jackpot arrangements for the venue or one or more gaming tables 10. In an embodiment the OWAP 408 may be a remote server and database through which the venue can configure, maintain, audit and amend one or more progressive jackpot arrangements and features such as contribution rates (e.g. what, percentages of progressive associated wagers are allocated to the one or more jackpots and reset values), jackpot triggers (e.g. what hand(s) in the underlying game will trigger entitlement to all or a share of a progressive jackpot), metering (e.g. maintain a record of contributions and allocations for accounting and auditing), select which progressive jackpot scheme to apply from, for example, several constructed templates and define the graphics and display packages to drive the video progressive display(s) 410. The local progressive controller 406 may be dedicated to a specific table 10 or may communicate with several tables 10. As described below, tokens placed on the bet sensors 28 register as an entry into one or more offered progressive bonus game jackpot propositions. The bet sensors 28 detect the placement (optically or electromagnetically) of a token and the entry is processed by one or more of the local progressive processor 406 and OWAP 410 to increment the progressive jackpot(s). As stated above, a percentage of each bonus game progressive entry is allocated to incrementally grow the progressive jackpot(s) and fund a reset value for the jackpot(s) when the jackpot(s) is/are awarded.

For dealing of physical cards for the play of the base game and/or feature game, the system 12 may include an automatic shuffler 412 of a type known in the art. The shuffler 412 receives one or more decks of physical playing cards and randomizes them through an electro-mechanical shuffling process. The shuffler 412 may be a combined shuffler and dealing shoe or, in an embodiment, the shuffler 412 may be a card reading shoe adapted to received shuffled cards and read them as they are dispensed during the play of the game. As used herein and depicted in FIG. 4 the reference to shuffler 412 shall include a shuffler, a shuffler-shoe and a shoe configured to acquire information including card values. The shuffler 412 communicates with a local input-output controller shown in FIG. 4 as a shufflelink IO 414. The shufflelink IO 414 receives data from the electronic shuffler 412 such as operational data (where the shuffler 412 acquires card value and suit information during the shuffling process, which data may include the order of the shuffled cards alone, or with a "smart" card dealing shoe (not shown)) and may acquire the data for each hand of play such that bonus game event triggers, mis-deals and other information can be electronically detected. Data is exchanged between the shufflelink IO 414 and a processor-server shown as a shufflelink host 416. The shufflelink host 416 is configured to receive data for diagnostic purposes from the shufflers 412 in the casino venue. A business intelligence processor-server BI 418 communicates with the shufflelink host 416 to analyse the data from a business intelligence standpoint to, for example, determine the profitability of the table 10 for the casino.

To provide a means for identifying players at the table 10 who are members of the loyalty club (also referred to as the player's club), the system 12 at the table 10 includes a system interface 420 which may be a "Table View" including a card reader 422 adapted to read a player's loyalty card. The system interface 420 communicates with an interface controller 424, which, in turn, communicates with a casino market place CMP 426 which manages player loyalty accounts including player loyalty points and comps. The power bank module 428 of CMP 426 manages and supports cashless wagering features such as the funding and maintenance of the player's eWallet and cash-equivalent promotions. The account may be funded at the casino cashier or a kiosk. The CMP 426 communicates with the venue's slot management system shown as a slot data system SDS 430. SDS 430 manages the "commerce" from the gaming machines and tables 10 throughout the casino to determine things such as performance, irregularities and security information.

To enable players to fund their eWallet accounts and to cash out all or a portion of the accounts, at least one kiosk 432 is provided for the system 12. The kiosk 432 may include a player card reader, a displayed code scanner, a voucher or ticket reader (for vouchers and slot machine cash out tickets) and have a capability to dispense cash. The ability to read slot machine cash out tickets is well known, as is the ability to dispense cash. The kiosk 432 communicates with the SDS 430 and CMP 426 to access the player's eWallet account to deposit and withdraw funds. For example, a player could cash out a $100 ticket from a slot game and have the ticket read at the kiosk 432 and the $100 uploaded to the player's eWallet or dispensed as cash. Access to the player's eWallet may require entry of security information such as a personal identification number (PIN) at a display/keyboard at the kiosk 432.

The player mobile device 400 may also communicate with a Beverage Ordering Service System BOSS 444 and a point-of-sale manager 446. The player may thus order a beverage using his/her mobile device 400 or may use his/her mobile device at points of sale within the venue such as accessing his/her eWallet or loyalty account to purchase a meal or a room.

Figures 5A, 5B:
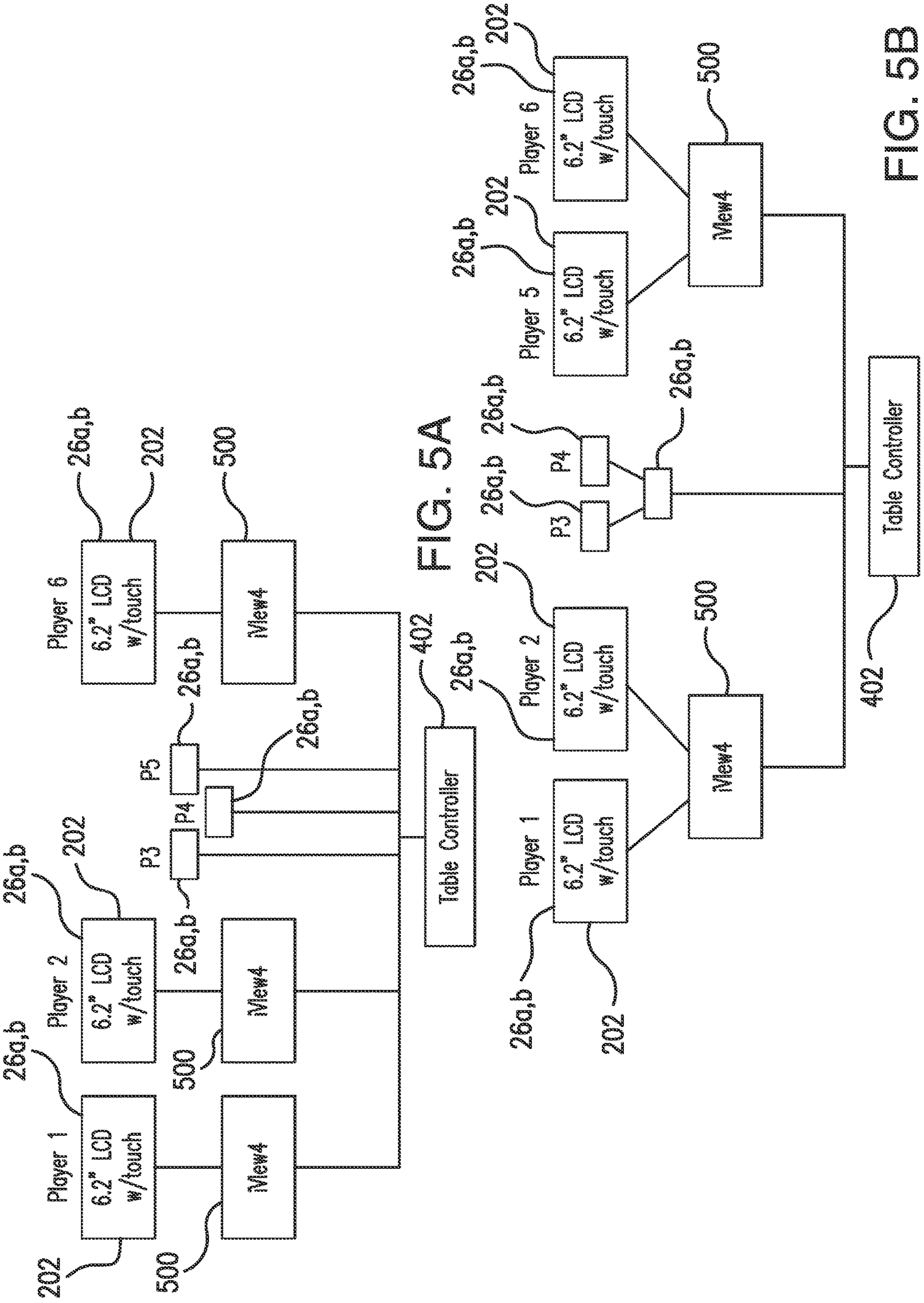
FIGS. 5A-C are schematics of various embodiments for the VDPIDs and table controller.
Figure 5C:
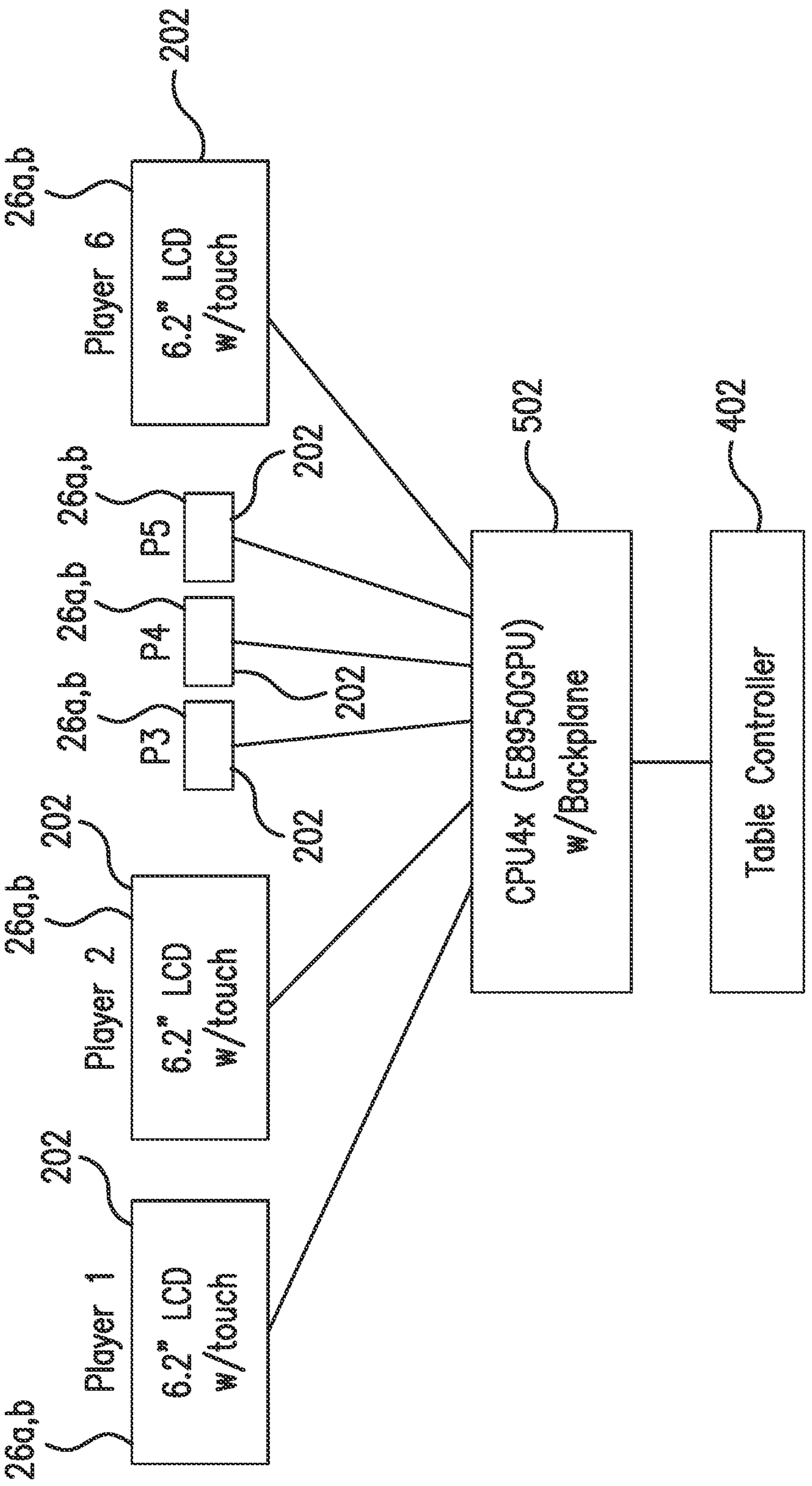

FIGS. 5A-5C illustrate several arrangements for the VDPIDs 26*a, b* and the VDPID controller 402. FIG. 5A shows each VDPID 26*a, b* display 202 is controlled by a dedicated iView controller 500 and all communicate with the VDPID controller 402. In FIG. 5B two VDPID displays 200 are under the control of a single iView controller 500. In FIG. 5C the displays 200 are all under the common control of a common display controller 502 which communicates with the VDPID controller 402.

Figure 6A:
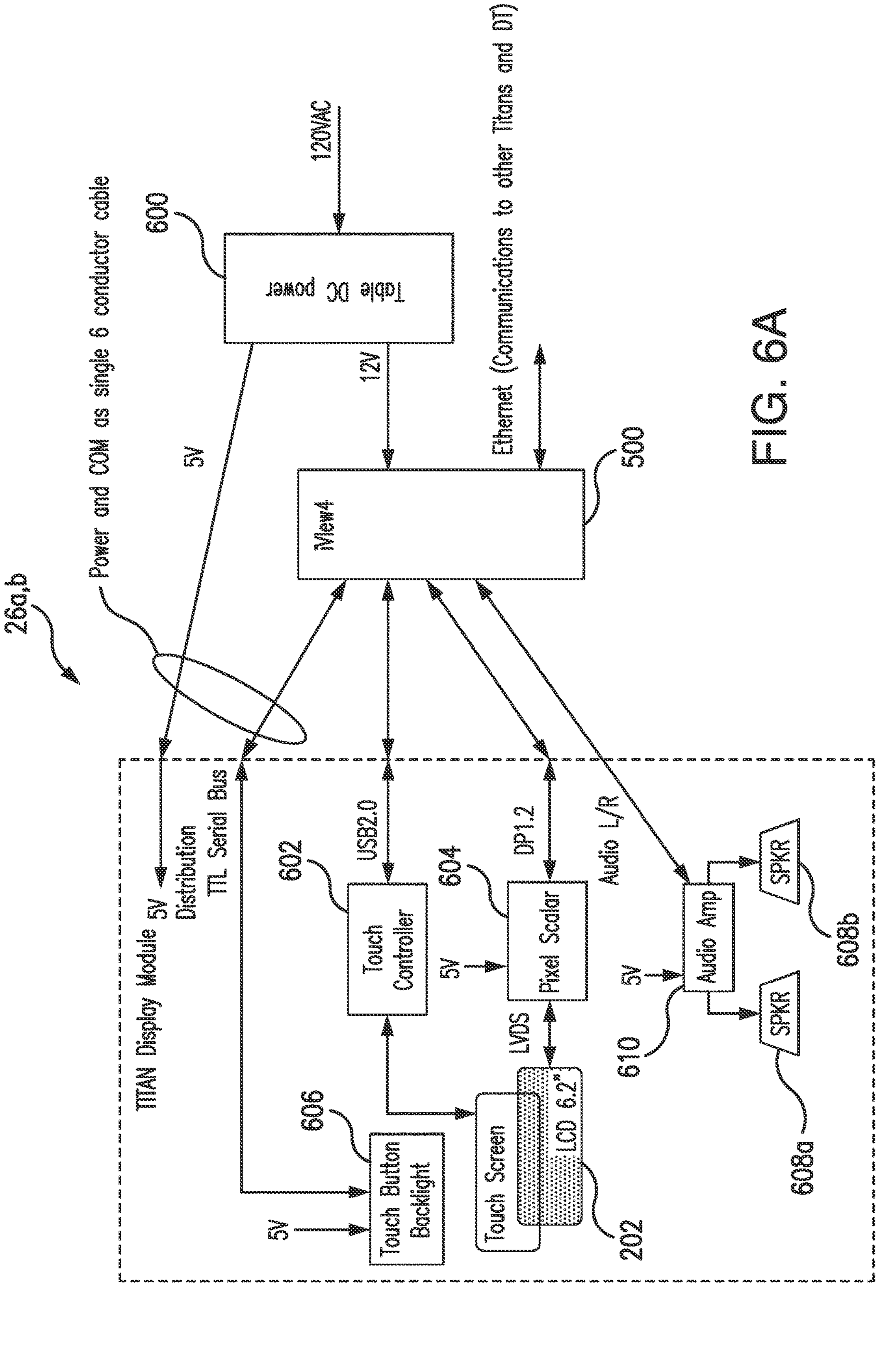
FIGS. 6A and B are schematics for the VDPIDs and supporting elements.

FIG. 6A is a schematic for the video display 202 and other utilities for the VDPIDs 26*a, b* and the iView controller 500. Power is provided to the VDPIDs 26*a, b* from a table power supply 600 to the video display 202 and iView controller 500. The VDPIDs 26*a, b* include a video display 202 with a touch screen and a touch screen controller 602. A scalar 604 scales content for display at the VDPIDs 26*a, b* which may be provided from several system 12 sources such as player loyalty and eWallet account information, dealer terminal 404 and the local progressive controller 406 or other sources. Also provided is a backlight 606 for the button 204, which may, for example, be embodied as an LED or other source to frame the physical button 204. Speakers 608*a, b* may also be provided driven by a speaker amp 610.

Figure 6B:
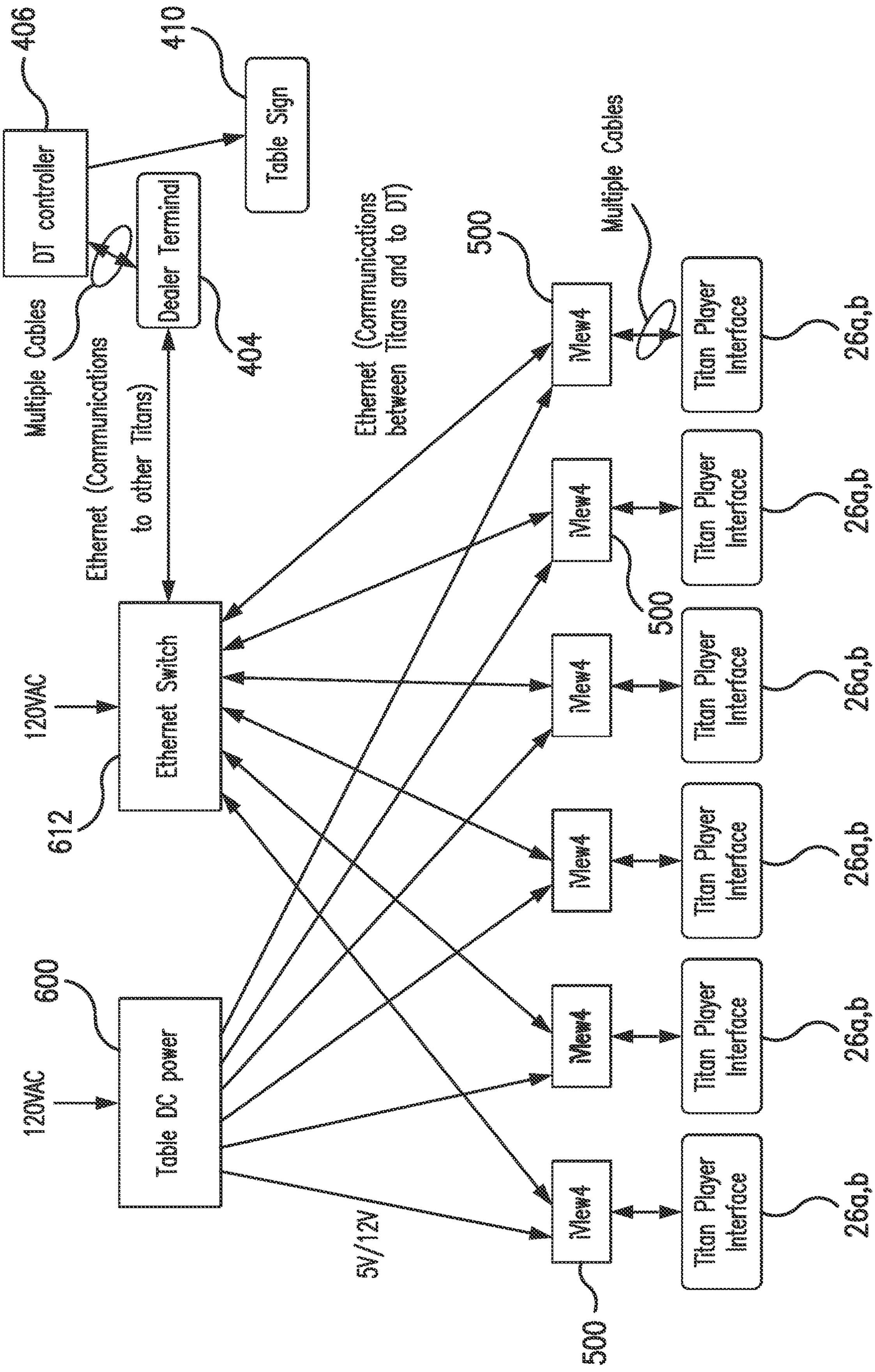

To provide communication within the system 12 an arrangement as suggested in FIG. 6B may be provided. In an embodiment such as depicted in FIG. 5A, each VDPID 26*a,b* is controlled by a dedicated iView controller 500 which are powered from the power supply 600 and which are coupled to a common Ethernet switch 612. The Ethernet switch 612 is in communication with the dealer terminal 404, other tables 12 (which may be linked for example to a common progressive jackpot), local progressive controller 406 and the other data and content, sources as described with reference to FIG. 4. The table video progressive display 410 is controlled by the system 12 sources including the local progressive controller 406 to display features associated with the game and the progressive such as one or more progressive meters.

Figure 7C:
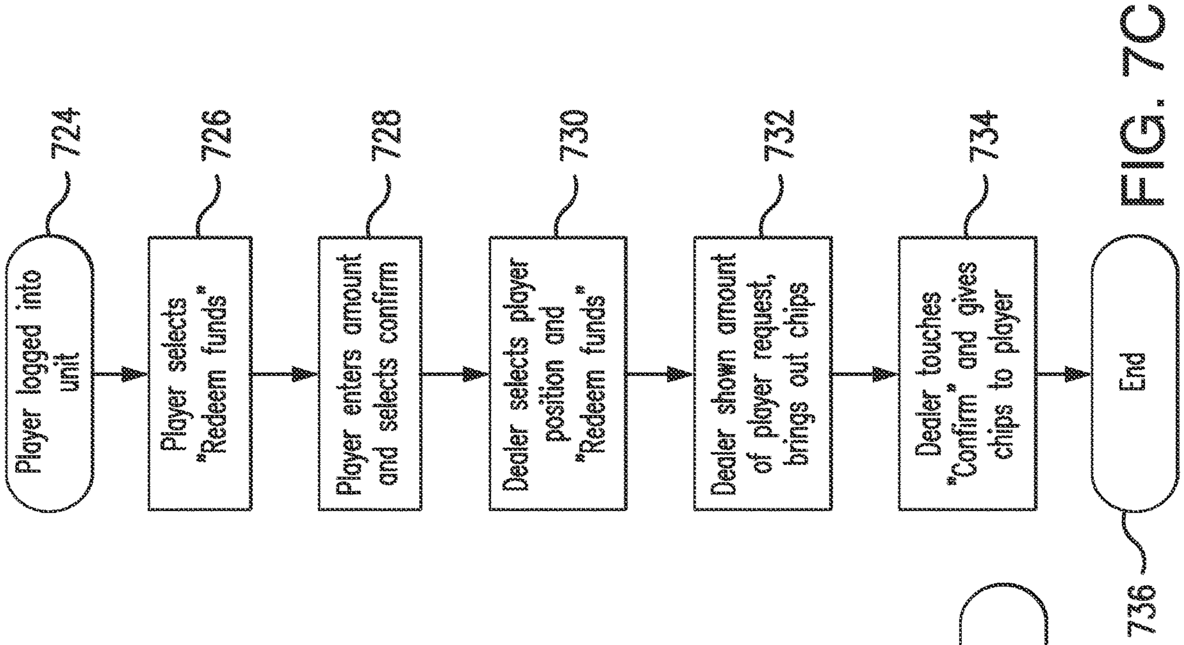
FIGS. 7A-F illustrate functional flow diagrams with respect to several features of the present invention.
Figure 7B:
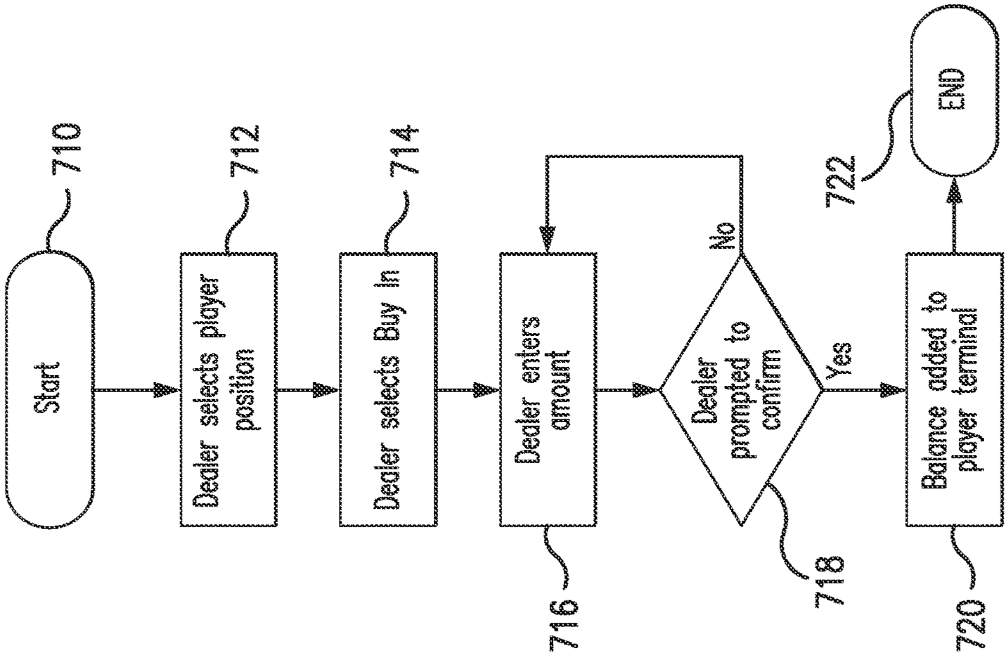
Figure 7A:
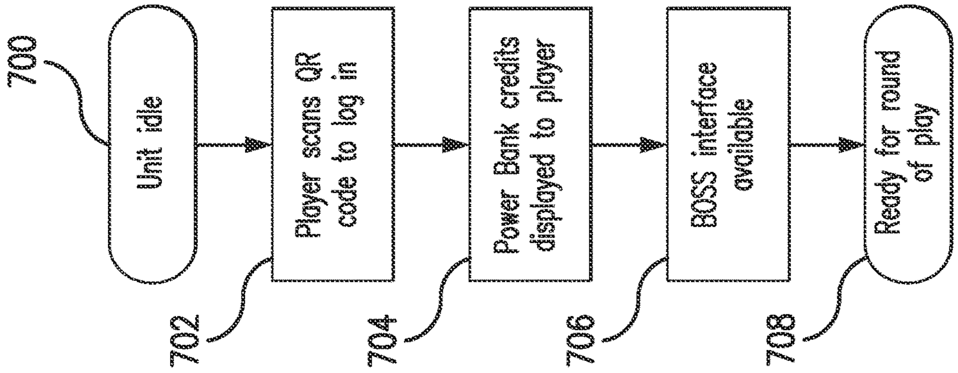

Turning to FIGS. 7A-F, the features, methods and operation of various embodiments of the invention, VDPIDs 26*a,b* and system 12 and methods and advantages will now be described. FIG. 7A illustrates features associated with a player redeeming a promotion at the table 10. Through various sources, the casino venue may choose to provide a player with promotional funds for playing the table game. The venue would select an amount and load the amount as promotional credits for the player that may be deposited at the power bank module 428 and the player eWallet account. A message would be sent (or cached to be sent) to the player's mobile device 400 informing him/her of the promotion and its conditions which is received by a text message which may be opened either as a text message or through the venue provided App the player has loaded or made accessible on his/her phone 400. Calling up or opening the promotion also causes the player's phone 400 to display a code (bar code, QR code or other machine-readable code) associated with the promotion. When the player enters or nears the casino venue sponsoring the promotion, through geo-location, the App may pull up the promotion as well as the code. In an embodiment, the App may also receive or pull information from the system 12 to provide information at the display of the phone 400 regarding the tables 10 where the promotion may be redeemed. Using the App, the player may accept an offer to reserve a position at a qualifying gaming table 10 from which to redeem the promotion and play the game. The reservation identifies the table 10 and its location and announces to the player they have reserved a seat and have a period to register at the table 10. The VDPID 26*a, b* and/or the dealer terminal 404 may indicate that the position is reserved for the reserving play such as displaying "Reserved for Phil" at the VDPID 26*a, b* video display 202.

With reference to FIG. 7A, the player sits at the table 10 (perhaps the table 10 where they have reserved a position using the App as described above). Since this is an open (or reserved) position the VDPID 26*a, b* is idle at 700. The player may call up his/her promotion on the phone 400 and display the associated code. Positioning his/her phone 400 over the bet sensor 28 associated with the position at 702 the bet sensor 28 optically scans and reads the displayed code. The reading of the code is communicated to the dealer terminal 404 as well as the system 12 including the power bank module 428 where the promotion is deposited. The reading of the code may also log the player in to the CMP server 426 for tracking the player's activities. At 704 the power bank module 428 displays at the player's VDPID 26*a, b* the value associated with the promotion as credits available for wagering, e.g. $10 promotional money. At the VDPID 26*a, b* the BOSS server 444 becomes available at 706 and at 708 the game and VDPID 26*a, b* is available for play. The bet sensor 28 may also read printed codes on a coupon, voucher, ticket or other instrument such as a printed promotional voucher, to retrieve the funds represented by the instrument.

At 704 the Power Bank module 428 may also display the funds available for play in the player's eWallet account. For example, the display 202 may announce, "You have $10 in Promotional Play. Your eWallet Account has $200."

With reference to FIG. 7B, funds may be made available through the tendering by the player of cash or chips to the dealer. At 710, the process is started and at 712 the dealer at the dealer terminal 404 selects by a button or switch the VDPID 26*a, b* associated with the player. At 714 the dealer accepts the player's cash/chips and at the dealer terminal 404 selects the buy-in function and at 716 enters the amount of the buy-in. The amount entered is confirmed at 718 and at 720 the confirmed amount is credited to the funds available at the player's VDPID 26*a, b* and the process is ended at 722. The tendering of funds may include a request for physical chips as well as electronic funds for the VDPID 26*a, b*. The dealer would tender the physical chips as at 716 enters the buy-in amount for electronic funds as described above.

The system 12 also enables the player to convert electronic funds into physical chips/tokens for play of the base game. In an embodiment as shown in FIG. 7C, the bonus game has a progressive jackpot feature and participation for the progressive is based upon wagering using physical chips/tokens. For example, the table game may be a Blackjack or Poker based game where players wager (using physical chips/tokens) on the base game and with a separate wager on the bonus game progressive feature. To make the bonus game progressive wager at the player's position he/she may be required to place a physical gaming chip/token, e.g. a $1 chip on the associated bet sensor 28. The sensor 28 may be configured to distinguish between different chip denominations such as a $1 chip versus a $5 chip. This feature may be based upon obtaining a digital image of the chip face laying on the bet sensor 28 and comparing that image to determine if the chips is a $1 or a $5 chip. The bonus game may provide different features for a $5 participation fee and a $1 fee. For example, a $5 participation fee may entitle the player to vie for all prizes including several progressive prizes and bonus feature games. A $1 participation fee may entitle the player to vie for a subset of the prizes. The sensor 28 may be controlled to illuminate to confirm participating in the progressive as well as provide a signal to increment the progressive by at least a percentage of the participation fee wagered thereon. The dealer would then collect the progressive wagers from the table 12 and store them in the chip tray 22. In addition to the progressive participation fee or wager, the players may be required to wager on the base game by placing chips/tokens in the appropriate location on the table 10. At 724 in FIG. 7C the player logs in perhaps as discussed with reference to FIG. 7A or 7B. At 726 the player on his/her VDPID 26*a, b* selects an input of "Redeem Funds" and at 728 selects the amount, e.g. $25. This selection is transmitted by the VDPID 26*a, b* to the dealer terminal 404 and power bank server 428 to access the player's eWallet funds. At 730 the dealer at the dealer terminal 404 selects the player's position, e.g. seat #4, and the video display at the dealer terminal 404 displays the amount of funds requested at 732. At 734 the dealer touches on his/her terminal a confirmation and gives physical chips/tokens to the player. The player's eWallet account is debited based upon the request and confirmation. At 736 the process ends.

Figure 7D:
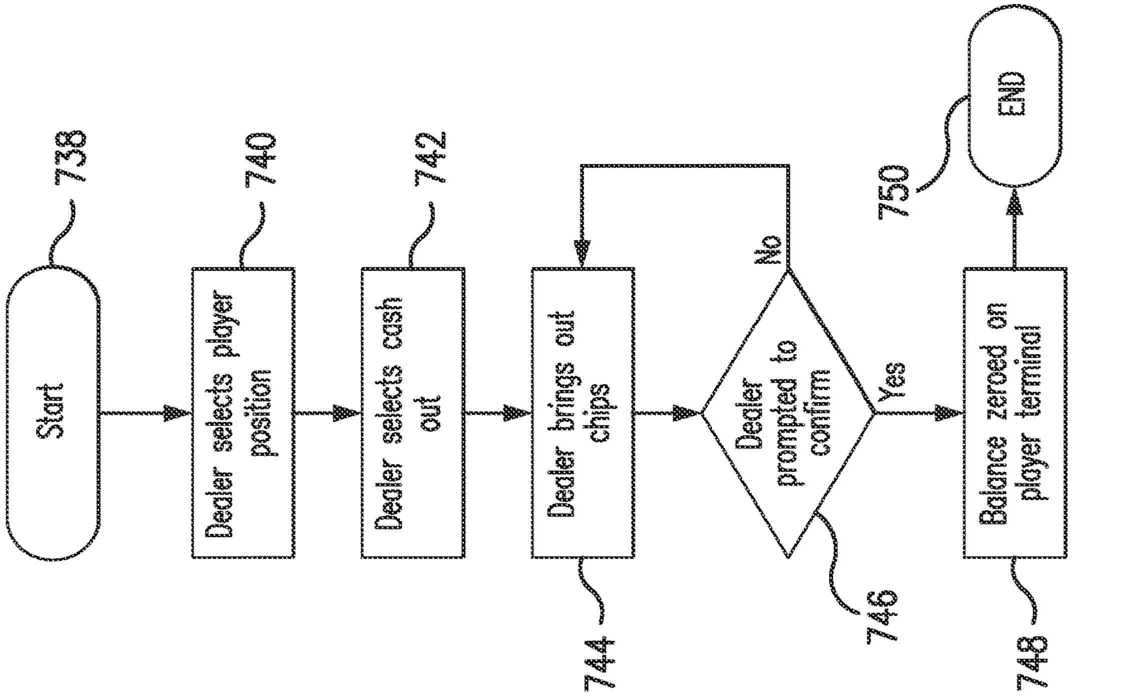

To cash out all or a portion of the available player funds at the table 10, several techniques can be used. One technique is for the dealer to accept, the remaining player physical chips/tokens and at the dealer terminal 404 select to credit the corresponding amount to the players eWallet account at the power bank module 428. The crediting of the amount would be displayed at the player's VDPID 26*a, b* to confirm and act as a receipt for the credit. Conversely, and as shown in FIG. 7D the player may cash out all or a portion of the electronic funds in his/her eWallet and convert the same to chips/tokens for use at another table or to cash out at a cashier cage. At 738 the process starts and at 740 the dealer at the dealer terminal 404 selects the appropriate VDPID 26*a, b* associated with the requesting player. At the dealer terminal 404 the dealer selects at 742 a cash out function for the designated VDPID 26*a, b*. The dealer at 744 assembles the chips/tokens corresponding to the amount being cashed out and at 746 the amount at the dealer terminal 404 is confirmed. Once the amount is confirmed it is paid to the player and at 748 the displayed funds at the VDPID 26*a, b* is zeroed out (or reconciled if not all funds were being cashed out) and at 750 the process is ended.

Figure 7E:
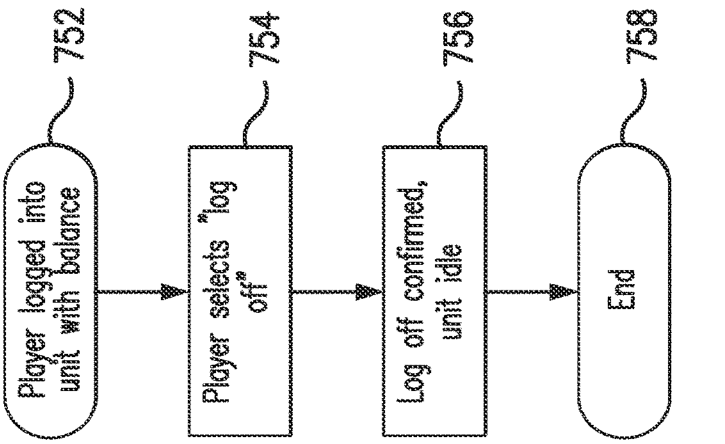

In one or more various embodiments, the player may end his/her gaming session as suggested in FIG. 7E. For example, if a player has exhausted his/her physical gaming chips/tokens but has an available balance of eWallet funds displayed on his/her VDPID 26*a,b* as at 752, the player at 754 may select to log off from the system 12. At log off, if funds are cached at the player's VDPID 26*a, b*, they would be uploaded to the power bank module 428. Where the funds are retained at the power back module 428 and are debited and credited with each wager, logging off at 754 breaks the connection with the power bank module 428 and the accessible funds. At 756 the log-off is confirmed and the VDPID 26*a, b* is placed in an idle condition. At 758 the process is ended.

Figure 7F:
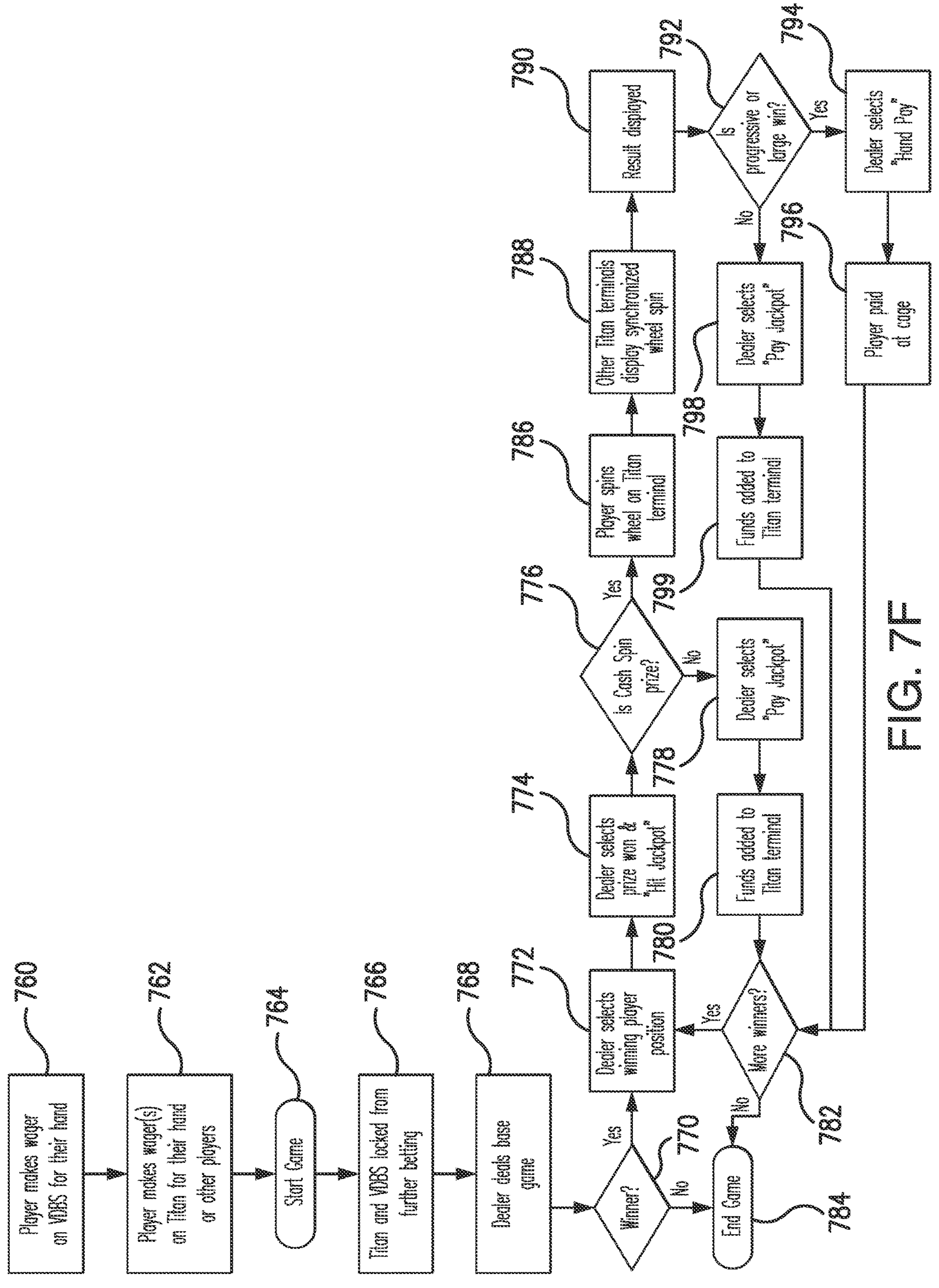

The operation and method for an embodiment employing the system 12 is shown in FIG. 7F. At 760 the player places a token on the bet sensor 28 to qualify for a progressive bonus game for a base game. The player also makes a wager with physical chips for the base game such as Blackjack or Pai Gow. At his/her VDPID 26*a, b* the player can also wager credits at 762 on one or more secondary games. For example, the physical wager at the bet sensor 28 may qualify the player for a progressive bonus game triggered by a bonus event such as when the player receives a triggering outcome in the base game (such as a Royal Flush in Pai Gow Poker) or for other awards associated with certain rare outcomes in the base game, e.g. four Aces. The player may also wager at the VDPID 26*a, b* to qualify the player for a "mystery" secondary game event not associated with the base game, such as an event triggered by a random number generator, or a predetermined trigger such as a pool reaching a certain level or a virtual lottery such as described in Olive, U.S. Pat.

No. 8,663,000 issued Mar. 4, 2014 and titled "SLOT MACHINE GAME AND SYSTEM WITH IMPROVED JACKPOT FEATURE," the disclosure of which is incorporated herein by reference. An additional feature of the system 12 is that the VDPID 26*a, b* enables the player to wager on another player receiving a bonus triggering base game outcome or back bet that the other player will receive a certain outcome such as a winning outcome. In the prior art such as Jones et al U.S. Pat. No. 5,794,964 described above, player A could not bet that player B would obtain the bonus triggering outcome. 1*n* the system 12 of the present invention player A may make a progressive bonus game wager that he/she will receive a base game outcome to trigger the bonus event by placing his/her token on his/her bet sensor 28 as well as make a progressive bonus game wager that player B (or any other active player at the table 10) will receive a base game outcome to trigger the bonus event by selecting the other player and posting the progressive game bonus wager on his/her VDPID 26*a, b*—in effect, back betting on player B. The wager at 762 may also entitle the player to an award of the play of a bonus game feature perhaps triggered when a player receives three 7s of any suit in Blackjack. The VDPID 26*a, b* may provide an alternative way to bet the progressive bonus game aside from placing a physical chip on the bet sensor. The VDPID 26*a, b* enables players to make secondary feature wagers on one or more propositions such as mystery events and game outcomes for themselves or other players or the dealer. As stated above, if player A thinks player B is on a "hot streak" player A may back bet with player B on player B's outcome.

At 764 the game is started and to prevent further progressive or secondary feature wagering at 766 the bet sensors 28 and VDPIDs 26*a, b* are locked out from further wagering. At 768 the dealer deals the base game using physical cards dispensed from a deck of cards, multiple decks or a card-dealing shoe to complete the base game. At 770 the dealer determines if there is any progressive or secondary feature winner. If so the dealer selects at 772 the VDPID 26*a, b* associated with the triggering outcome and at 774 the dealer selects the award. A feature of the present invention provided by the VDPIDs 26*a,b* is that part of the award structure can be a known award, either a fixed award or an award from a progressive pool, or can be an entry into a bonus feature game which determines the prize. The bonus feature game increases the excitement associated with the awarding of a prize. For example, where a player receives a triggering base game outcome the prize structure may include a chance to spin a virtual wheel to determine the award. At 776 the dealer determines if the prize is an opportunity to spin the wheel. If not, at 778 the dealer at the dealer terminal 404 enters a pay jackpot command and at 780 the award is posted to the player's VDPID 26*a, b*. At 782 the dealer checks for other winners and if there are, the award process as to those player(s) starts as 772. If there are no other winners at 782 at 784 the hand of the game is ended.

If at 776 the base game outcome is a triggering event of the spin of a virtual wheel at 786 the triggering player's VDPID 26*a, b* is enabled and displays at least a segment of a prize wheel that may be virtually spun by the player swiping his/her video display 202 to spin to determine the bonus award. At 788 the video displays for the other VDPIDs 26*a, b* as well as the table display 410 may be synchronized to display images corresponding to the prize wheel to increase the excitement at the table 10 and for bystanders. At 790 the results of the wheel spin are displayed. If the result at 792 is a large prize or the progressive prize at 794 the dealer at the dealer terminal 404 selects the "Hand Pay" input to indicate that the player must be paid by hand. At 796 the hand pay may instruct the player to go to the cashier cage for payment indicated or the payment may be made by an attendant at the table 10. The process returns to 782 to determine if there are other bonus game winners.

If at 792 the award is not above a limit the dealer at the dealer terminal 404 selects at 798 to pay the award and at 799 the award is paid to the player's VDPID 26*a, b.*

Figure 8A:
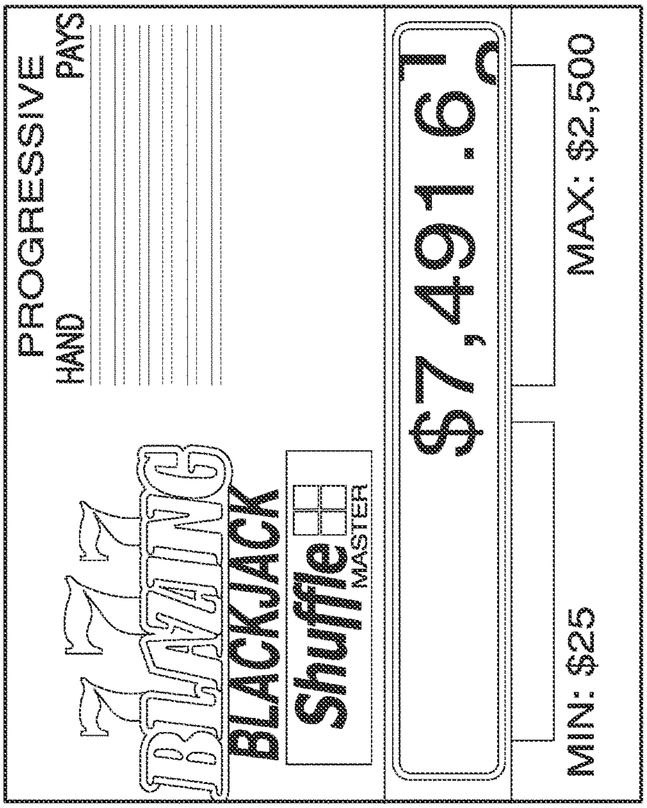
FIGS. 8A-C illustrate views for a bonus game feature operable using the VDPIDs.
Figure 8B:
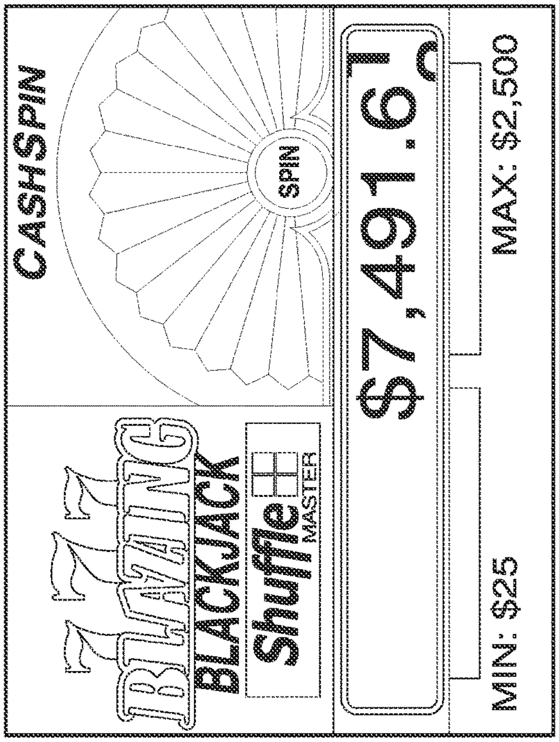
Figure 8C:
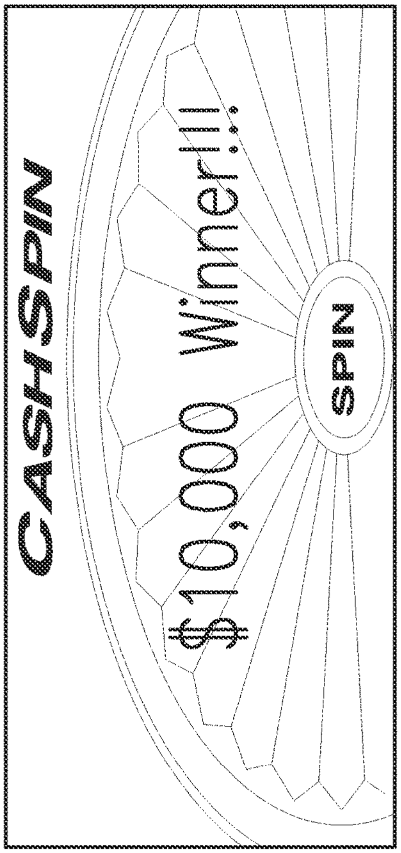

FIGS. 8A-C illustrate some examples of the displays associated with the play of games according to the system 12. In the example illustrated the game is BLAZING 7s BLACKJACK which game includes a Blackjack base game with a bonus game revolving around the player receiving 7s during play of the base game. Player A makes a wager in physical chips at the table 10 to play the base game and a $1 bonus wager by placing a physical S1 chip on the bet sensor 28. Additionally, Player A makes a wager at his/her VDPID 26*a, b* that either or both Players B or C will receive hands to trigger a bonus game event. Those triggers for the bonus game event may be according to the following bonus award schedule:

| Hand | Pays |
|---|---|
| Three 7s of Diamonds | 100% of the Progressive Mega Prize |
| Three 7s Suited (Other) | 100% of the Progressive Major Prize |
| Three 7s Same Color | Cash Wheel Spin |
| Three 7s | Cash Wheel Spin |
| First Two Cards 7s | Cash Wheel Spin |
| Either of the 1$^{st}$ Two Cards a 7 | $10 |

In the example, the Progressive Mega Prize is shown to be incremented by currently at $7,491.61 and the Major Prize at $3,748.81. Both of these prizes have reset values, i.e. values above "0" to which they will reset after the prize is awarded. By way of example only, and for this example, the reset value for the Mega Prize is $5000 and for the Major Prize $3000.

Play is commenced with the dealer dealing the first two cards to each Player A, B and C and to himself. FIG. 8A shows an example of the bonus game display which may be presented at the table display 24 (FIG. 1). The players make their decisions regarding their hands to complete the base game according to the known rules of Blackjack. The losing base game wagers are collected and the winning base game wagers are paid. The dealer then assesses whether any player has obtained a bonus game triggering outcome. For example, Player A may have received a 7 in the first two cards. The dealer at the dealer terminal 404 logs the bonus win and pays Player A $10 according to the bonus award schedule. Player B may have received a hand of three unsuited 7s. The dealer at the dealer terminal 404 identifies the VDPID 26*a, b* associated with Player B and enables the spin of a virtual cash wheel to determine the prize. Player B's VDPID 26*a, b* displays a wheel as shown in FIG. 8C and the table display 24 may assume a synchronized display of the cash wheel as well for the other players to see. In an embodiment, all VDPIDs 26*a, b* may display inactive, synchronized views of the virtual cash spin wheel. Swiping their video display 202 or otherwise prompting the spin, the virtual wheel spins to identify the prize to be awarded as suggested by the pointer on the displays. If the indicated award is above a certain limit a hand pay condition may exist and is handled as described above. Otherwise, the indicated prize is awarded to the player by transferring electronic funds to Player B's VDPID 26*a, b*. Player A, who also bet the bonus on Player B's hand, receives a duplicate prize paid in the same manner.

Player C is fortunate enough to receive three 7s of Diamonds and is entitled to be awarded the current value of the progressive Mega Prize. This award, in the example, would be by a hand pay. Player A (or any additional players who wagered on the bonus along with Player C) would receive the jackpot reset value that would also be handled as a hand pay.

While certain illustrative embodiments have been described in connection with the figures, those of ordinary skill in the art will recognize and appreciate that the scope of this disclosure is not limited to those embodiments explicitly shown and described herein. Rather, many additions, deletions, and modifications to the embodiments described herein may result in embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

What is claimed is:

1. A method of operating a gaming system for use with first and second live gaming tables, each table offering a live dealer-administered base game, each table bearing a physical base game layout with a plurality of player positions to accommodate respective player interface devices associated with respective live players, the base game being played with physical playing cards dealt from a card-handling device onto the table, the gaming system including a remote system and a local table system, the remote system being remote from the first and second tables and storing an electronic fund account of a live player, the local table system being at each table and including a dealer terminal managed by a live dealer, the method comprising:

in response to a first input by the live dealer at the dealer terminal at the first table, selecting the player interface device associated with the live player that is providing physical chips to, or receiving the physical chips from, the live dealer;

in response to a second input by the live dealer at the dealer terminal at the first table, displaying, on the dealer terminal, a value of the physical chips; and crediting or debiting, by the remote system, the electronic find account by the value based on a communication received by the remote system from the local table system at the first table.

2. The method of claim 1, wherein the electronic fund account is credited in response to the live player providing the physical chips to the live dealer.

3. The method of claim 1, wherein the electronic fund account is debited in response to the live player receiving the physical chips from the live dealer.

4. The method of claim 1, further including:

receiving, via the player interface device, a wager from the live player on a secondary event that may occur during play of the base game; and debiting, by the remote system, the wager from the electronic fund account.

5. The method of claim 4, further including crediting, by the remote system, any award amount from the secondary event to the electronic fund account.

6. The method of claim 5, further including displaying the secondary event on the player interface device.

7. The method of claim 5, wherein the secondary event is selected from a group consisting of a particular game outcome for the player, a particular game outcome for another player, or a particular game outcome for the live dealer.

8. The method of claim 1, further including:

in response to a first input by the live dealer at the dealer terminal at the second table, selecting the player interface device associated with the live player that is providing physical chips to, or receiving the physical chips from, the live dealer;

in response to a second input by the live dealer at the dealer terminal at the second table, displaying, on the dealer terminal, a value of the physical chips; and crediting or debiting, by the remote system, the electronic fund account by the value based on a communication received by the remote system from the local table system at the second table.

9. A gaming system comprising:

first and second live gaming tables, each table offering a live dealer-administered base game, each table bearing a physical base game layout with a plurality of player positions to accommodate respective player interface devices associated with respective live players, the base game being played with physical playing cards dealt from a card-handling device onto the table;

a remote system being remote from the first and second tables and storing an electronic fund account of a live player;

a local table system being at each table and including a dealer terminal managed by a live dealer; and at least one electronic processor configured to execute instructions, which when executed, cause the gaming system to perform operations to:

in response to a first input by the live dealer at the dealer terminal at the first table, select the player interface device associated with the live player that is providing physical chips to, or receiving the physical chips from, the live dealer;

in response to a second input by the live dealer at the dealer terminal at the first table, display, on the dealer terminal, a value of the physical chips; and credit or debit, by the remote system, the electronic fund account by the value based on a communication received by the remote system from the local table system at the first table.

10. The gaming system of claim 9, wherein the electronic fund account is credited in response to the live player providing the physical chips to the live dealer.

11. The gaming system of claim 9, wherein the electronic fund account is debited in response to the live player receiving the physical chips from the live dealer.

12. The gaming system of claim 9, wherein the at least one electronic processor is further configured to execute instructions, which when executed cause the gaming system to perform operations to:

receive, via the player interface device, a wager from the live player on a secondary event that may occur during play of the base game; and debit, by the remote system, the wager from the electronic fund account.

13. The gaming system of claim 12, wherein the at least one electronic processor is further configured to execute instructions, which when executed cause the gaming system to perform operations to credit, by the remote system, any award amount from the secondary event to the electronic fund account.

14. The gaming system of claim 13, further including displaying the secondary event on the player interface device.

15. The gaming system of claim 13, wherein the secondary event is selected from a group consisting of a particular game outcome for the player, a particular game outcome for another player, or a particular game outcome for the live dealer.

16. The gaining system of claim 9, wherein the at least one electronic processor is further configured to execute instructions, which when executed cause the gaming system to perform operations to:

in response to a first input by the live dealer at the dealer terminal at the second table, select the player interface device associated with the live player that is providing physical chips to, or receiving the physical chips from, the live dealer;

in response to a second input by the live dealer at the dealer terminal at the second table, display, on the dealer terminal, a value of the physical chips; and credit or debit, by the remote system, the electronic fund account by the value based on a communication received by the remote system from the local table system at the second table.

17. One or more non-transitory, machine-readable storage media having instructions stored thereon, which instructions, when executed by one or more electronic processors of a gaming system cause the gaming system to perform operations comprising:

in response to a first input by a live dealer at a dealer terminal of a first table from first and second live gaming tables, selecting a player interface device associated with a live player that is providing physical chips to, or receiving the physical chips from, the live dealer, wherein the gaming system is for use with the first and second live gaming tables, each table offering a live dealer-administered base game, each table bearing a physical base game layout with a plurality of player positions to accommodate respective player interface devices associated with respective live players, the base game being played with physical playing cards dealt from a card-handling device onto the table, the gaming system including a remote system and a local table system, the remote system being remote from the first and second tables and storing an electronic fund account of the live player, the local table system being at each table and including the dealer terminal managed by the live dealer;

in response to a second input by the live dealer at the dealer terminal at the first table, displaying, on the dealer terminal, a value of the physical chips; and crediting or debiting, by the remote system, the electronic fund account by the value based on a communication received by the remote system from the local table system at the first table.

* * * * *